United States Patent Office 2,765,881
Patented Oct. 9, 1956

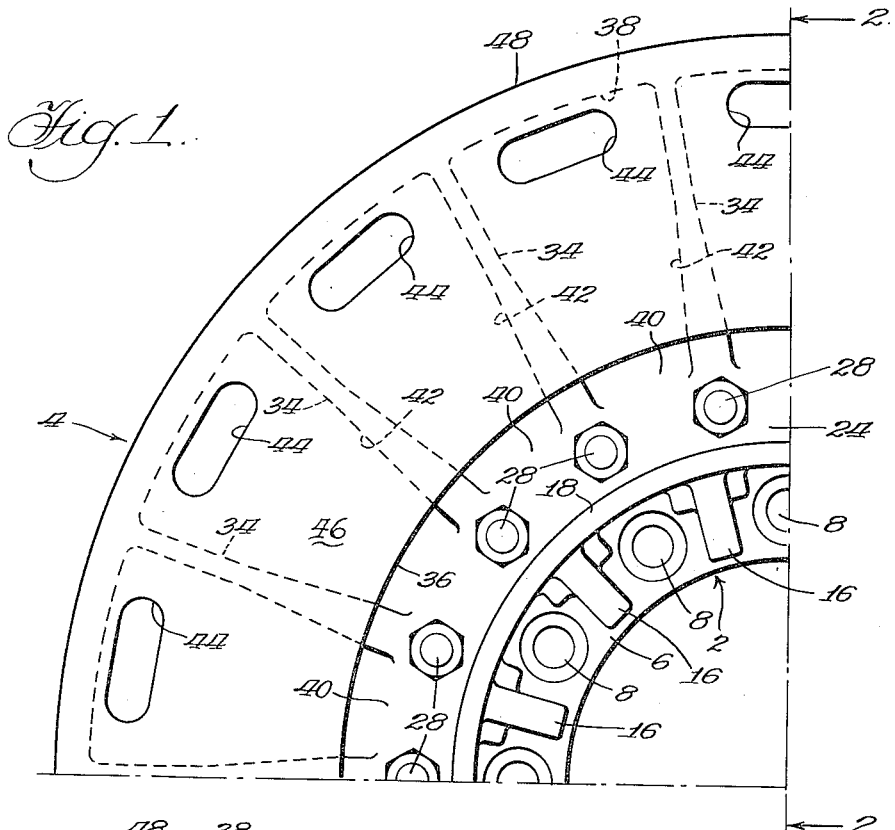
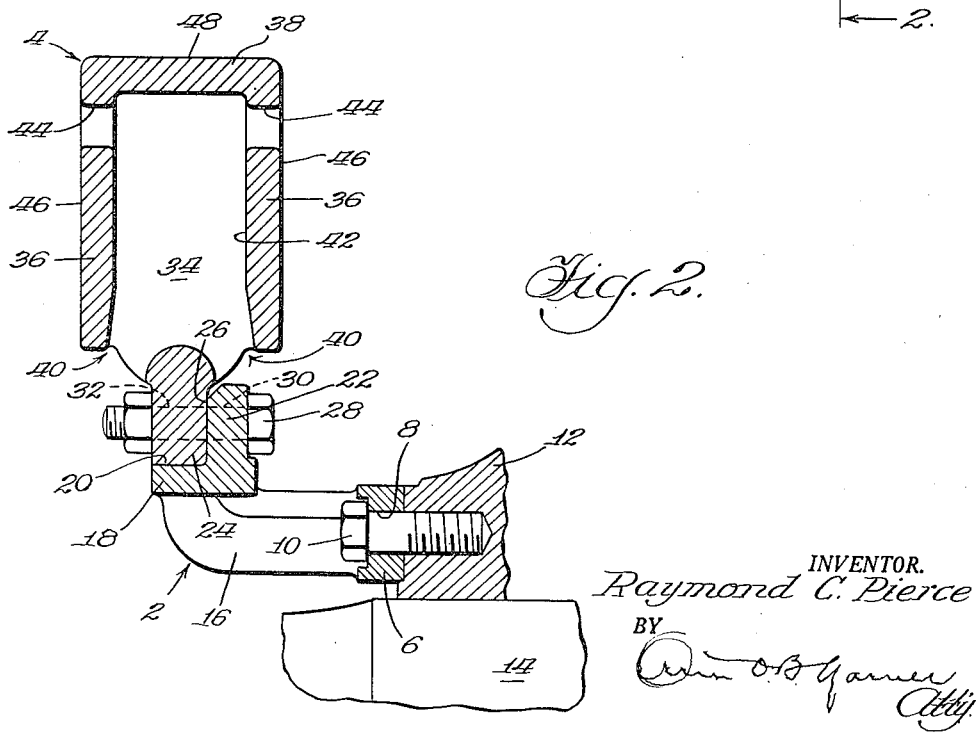

2,765,881

BRAKE ROTOR

Raymond C. Pierce, Chicago, Ill.

Application December 9, 1949, Serial No. 132,066

12 Claims. (Cl. 188—218)

This invention relates to off-wheel brakes and more particularly to a brake rotor or disc.

A general object of the invention is to provide a brake rotor affording increased braking areas including radial braking areas at opposite sides thereof and an axial braking area at the outer periphery thereof.

A more specific object of the invention is to provide a brake rotor comprising a support carrying a brake ring, the latter including spaced radial plates interconnected at their outer peripheries by a ring, the plates affording friction surfaces on their outer sides, the plates being interconnected by blades extending therebetween and the ring being connected to the radially outer ends of the blades to provide an exceptionally strong, efficient blower structure.

A further object of the invention is to provide a blower type brake rotor wherein air is drawn into the rotor from its inner periphery and wherein the air is thrown out of the rotor axially of the rotor to cool the friction shoes normally engaging the opposite sides of the rotor.

A further object of the invention is to provide a brake rotor wherein fluid passages are formed and arranged to direct the air against the friction ring at the outer periphery of the rotor and to circulate the air along the sides of the rotor.

A different object of the invention is to provide a brake rotor including an annular friction member and a support therefor, the support being preferably made of nonferrous material, such as aluminum, and the friction member being preferably made of cast iron.

The invention contemplates the provision of a friction member comprising spaced plates and an intervening peripheral brake web, the plates being interconnected by blades which are connected at their outer ends with the web, the plates being provided with transverse slots elongated circumferentially of the rotor and the slots being located adjacent the outer peripheries of the plates inwardly of the brake web.

These and other objects of the invention will become more apparent from the specification and the drawing, wherein:

Figure 1 is a fragmentary side elevational view of a brake rotor embodying the invention; and Figure 2 is a transverse sectional view taken substantially in the plane indicated by the line 2—2 of Figure 1.

Describing the invention in detail, the brake rotor or disk comprises a spoke-like annular support, generally indicated 2, and an annular friction member, generally indicated 4.

The support is preferably formed of nonferrous, high heat conductive metal, such as aluminum, and comprises a ring 6 at one end provided with a plurality of openings 8, 8 through each of which may extend a bolt 10 by means of which the support may be fastened to a wheel 12, the wheel being mounted on an axle 14, as will be readily understood by those skilled in the art. The ring 6 is provided with a plurality of axially extending fingers 16, 16 spaced circumferentially of the ring 6. The ends of the fingers 16, 16 remote from the ring 6 are surrounded by an annulus 18 formed integral with the fingers, said annulus having a cylindrical outer surface 20 at one end of which is provided an outturned flange 22 formed integral with said annulus.

The friction member, which is carried by the support, is preferably formed of cast iron and comprises at its inner periphery a circular member 24 which fits complementally onto surface 20 and seats in flat face engagement as at 26 against the flange 22. The member 24 is secured to the flange 22 by a plurality of bolts 28, 28 which extend through aligned openings 30 and 32 in the flange and member 24. The member 24 is formed at its outer periphery with a plurality of integral, radially extending, substantially equally spaced blades 34, 34. The blades extend between and are integral with spaced radially arranged plates 36, 36. The outer peripheries of the plates 36, 36 are interconnected by a cylindrical brake ring 38 which comprises an annular web preferably flat and relatively thin formed integral on its inner side with the radially outer ends of the blades 34, 34.

It will be observed that a blower type of brake rotor is provided, the air entering through inlet openings 40, 40 at the inner peripheries of the plates which are spaced radially outward of the outer periphery of the support. The air flows radially outward through passages 42, 42 which are defined between the plates and the blades, said air striking against the internal side of the brake ring 38 and then flowing axially of the rotor from opposite sides thereof through transverse slots 44, 44 in the plates 36, 36 adjacent the outer peripheries thereof radially inward of the ring 38. It will be understood that the brake rotor is engaged at opposite sides thereof on the radial surfaces 46, 46 by brake shoes and that the air in being expelled from the rotor through the slots 44 is directed to the vicinity of the shoes and the brake heads carrying said shoes, whereby the same are cooled. Furthermore, the air along the friction faces 46, 46 of the brake rotor is agitated so as to effect a more efficient dissipation of the heat on these faces. In addition, the air is caused to strike at its full velocity against the inner side of the peripheral brake ring to thereby efficiently cool the same and the outer friction face 48 thereof. It will be noted that the location of the slots does not interfere with the application of the friction shoes and that the friction areas 46 are uninterrupted. In addition, the skeletal construction of the support permits an efficient circulation of the air to both sides of the rotor and also permits cooling of the support. It will be understood that the area of the slots 44, 44 is equal to or greater than the area of the air intake 40, 40.

The construction of the support and the method of attaching the friction member to the support permits a reduction of the diameter of the support whereby the friction plates may be made larger than normally, thereby providing additional friction area.

It will be readily noted that the rotor herein described affords an efficient arrangement for dissipating heat and presents a novel arrangement of friction surfaces to provide an effective brake member.

I claim:

1. A brake motor comprising a friction member and a support therefor, said supporting being formed of aluminum and comprising a mounting ring at one end, a plurality of axially extending fingers connected at one of their ends to said ring, an annulus surrounding the other ends of said fingers and formed integral therewith, a cylindrical mounting surface on the outer periphery of said annulus, an outturned flange on the outer periphery of said annulus at one end of said surface, said friction element comprising a central mounting ring snugly fitted onto said surface and in abutment at one side with a complementary side of said flange, a plurality of bolts securing said flange to said last-mentioned ring, a pair of spaced generally parallel friction plates, a friction web interconnecting said plates at their outer peripheries, and a plurality of blades connected at their inner ends to said last-mentioned ring and extending radially outwardly therefrom between said plates to said web and formed integral with said plates and web, said plates presenting friction areas on their remote sides spaced inwardly of the outer periphery thereof and said web presenting a friction surface at the outer periphery of said rotor, said plates being formed with a plurality of slots extending transversely therethrough between said surfaces, said blades and plates defining radially extending fluid passages therethrough having inlets at the inner peripheries of said plates and having outlets through said slots.

2. A brake rotor comprising an annular aluminum support including a mounting ring at one end, a plurality of axially extending fingers connected to the mounting ring, a cylindrical band spaced axially from said ring and connected to the fingers and presenting an external annular seating surface, a radially outwardly extending flange on the band, a friction member comprising a central ring snugly fitted onto the surface and seated against the flange, a plurality of bolts extending through aligned openings in the flange and last-mentioned ring rigidly securing the same, a plurality of outwardly extending radial blades integral with said last-mentioned ring, and a pair of radially extending plates connected at their outer peripheries and connected to the lateral edges of said blades, said plates being spaced at their radially inner peripheries from said support and having a plurality of slots adjacent their outer peripheries extending lengthwise circumferentially of the rotor.

3. A brake rotor comprising an outer cylindrical friction web and a pair of friction plates connected to the opposite ends of said web and extending radially inwardly therefrom, a plurality of radially arranged blades between said plates integral therewith and with the web, a mounting ring connected to the inner ends of said blades, a support complementally seating said ring at its inner periphery and at one of its sides, and nut and bolt assemblies connecting said ring with said support, said plates being spaced at their inner peripheries radially outward of said support and defining with said ring fluid inlets communicating with passages defined by the blades between said plates, and fluid outlets in the form of slots through said plates disposed adjacent said web radially inwardly thereof and effective to direct fluid from said passages through opposite sides of said rotor.

4. A brake rotor for a wheel and axle assembly comprising a support, an annular brake member carried thereby for rotation therewith, said member including spaced generally parallel radial plates presenting friction faces on their remote sides, an annular web interconnecting said plates at their outer peripheries and presenting an external friction surface, and blades between said plates integrally united therewith at their lateral edges and with said web at their radially outer ends said blades and plates defining fluid passages having inlets at the radially inner extremities of said plates and having outlets in the form of transverse slots formed in said plates inwardly of said web thereadjacent, said support comprising an outwardly flaring web having at its outer periphery a flange removably secured to the inner periphery of said brake member and at its inner periphery a flange removably secured to a wheel of the assembly.

5. A brake rotor comprising a friction member, a support therefor, said support being formed of nonferrous material having relatively high heat conductivity, said support comprising a plurality of circumferentially spaced axially extending fingers, a ring connected to one of the ends of the fingers and having openings therethrough for associated securing means, an annulus surrounding the fingers at their other ends and formed integral therewith and presenting an outer annular seating surface for said friction member, an outturned flange connected to said annulus, and means securing said flange to said friction member.

6. A support for a brake rotor comprising a somewhat bell-shaped member including a plurality of circumferentially spaced fingers extending lengthwise axially of said support, a mounting ring interconnecting the fingers at one of their ends, an annulus connected to the other ends of said fingers, and an outturned flange on said annulus affording means of connection for said support to an associated brake member.

7. A brake rotor support comprising a mounting ring at one end, a plurality of circumferentially spaced fingers extending axially of said support and connected at one of their ends to one side of said ring and flaring radially outwardly at their other ends, an annulus surrounding said other ends of said fingers and formed integral therewith, said annulus presenting a radially outwardly facing mounting area for an associated brake element, and a radially outwardly extending flange on said annulus at one end of said area.

8. A brake rotor comprising spaced annulus plates, a cylindrical web interconnecting said plates at their outer peripheries, a plurality of radially disposed blades interconnecting said plates, a mounting ring connected to the inner edges of said radially disposed blades, an axle, and an annular spoke-like member removably connected to said axle and to said mounting ring.

9. An annular, air cooled, brake rotor for a wheel and axle assembly comprising a friction member having a cylindrical web with an outer axial friction surface, and having spaced annular friction plates with outer radial friction surfaces at the extremities of said cylindrical web, said plates being provided with air vent openings, a plurality of equally spaced, axially radial blades in an annular space defined by said spaced web and friction plates, a mounting annulus attached to the middle of the inner ends of said blades and defining in part inlet air passages formed by the inner edges of said spaced annular friction plates and blades, and a support comprising an outwardly flaring web having at its outer periphery a flange removably secured to said annulus and at its inner periphery a flange removably secured to a wheel of the assembly.

10. In a brake rotor, a cast, annular, air cooled, friction member having a cylindrical web with an outer axial friction surface, and having spaced annular friction plates with outer radial friction surfaces at the extremities of said cylindrical web, said plates being provided with outlet air passages, a plurality of equally spaced, axially radial blades in an annular space defined by said spaced web and friction plates, a mounting annulus attached to the middle of the inner ends of said blades and defining in part inlet air passages formed by the inner edges of said spaced annular friction plates and blades, an annular, axle supported, mounting member, and an annular spoke-like member with mounting flanges at each end thereof and provided with spaced mounting holes.

11. In a brake rotor adapted for mounting on a wheel, a reversible friction member having spaced radially extended friction plates with a relatively thin, flat axially disposed connecting web integrally formed at the outer periphery of said plates, and a plurality of radially extended blades interconnecting the plates and the web, the combination of an unobstructed fluid chamber defined by the plates, the blades, and the web, at least one radially directed fluid inlet on each side of said chamber at the inner periphery of said chamber, at least one axially directed outlet on each side of said chamber at the outer periphery of said chamber immediately adjacent said web, and a support having one end detachably secured to said friction member and the other end detachably secured to said wheel.

12. In a brake rotor adapted for mounting on a wheel, a reversible friction member having spaced radially extended friction plates with an axially disposed relatively thin, flat interconnecting web integrally formed at the outer periphery of said plates and a plurality of radially extended blades interconnecting the plates and the web, the combination of an unobstructed fluid chamber defined by said plates, said blades, and said web, radially directed inlet openings on both sides of the rotor of the inner periphery of said plates, axially directed outlet openings on both sides of the rotor adjacent said web at the outer periphery of said plates and a support removably interconnected between said friction member and said wheel.

References Cited in the file of this patent

UNITED STATES PATENTS

| | | |
|---|---|---|
| 400,887 | Wilson | Apr. 2, 1889 |
| 1,994,689 | Cooper | Mar. 19, 1935 |
| 2,242,855 | Flowers | May 20, 1941 |
| 2,274,859 | Eksergian | Mar. 3, 1942 |
| 2,348,078 | Ledwinka | May 2, 1944 |
| 2,382,550 | Eksergian | Aug. 14, 1945 |
| 2,399,010 | Eksergian et al. | Apr. 23, 1946 |
| 2,412,432 | Tack | Dec. 10, 1946 |

FOREIGN PATENTS

| | | |
|---|---|---|
| 797,074 | Germany | June 12, 1941 |